United States Patent

Szymber

[15] 3,635,551
[45] Jan. 18, 1972

[54] AUTOMATIC FOCUSING SYSTEM FOR PROJECTORS AND THE LIKE

[72] Inventor: Oleg Szymber, Elk Grove, Ill.
[73] Assignee: G.A.F. Corporation, New York, N.Y.
[22] Filed: May 18, 1970
[21] Appl. No.: 37,950

Related U.S. Application Data

[63] Continuation-in-part of Ser. No. 843,311, July 22, 1969, abandoned.

[52] U.S. Cl. ............................353/101, 250/204, 352/140, 353/69
[51] Int. Cl. .......................................G01b 3/00, G01b 21/14
[58] Field of Search ............353/69, 101; 352/140; 350/255; 250/204

[56] References Cited

UNITED STATES PATENTS

| | | | |
|---|---|---|---|
| 3,249,001 | 5/1966 | Stauffer | 352/140 |
| 3,450,883 | 6/1969 | Thomas | 353/69 |
| 3,469,925 | 9/1969 | Urbach et al. | 353/101 |

*Primary Examiner*—Leonard Forman
*Assistant Examiner*—Steven L. Stephan
*Attorney*—McDougal, Hersh & Scott

[57] ABSTRACT

Wave energy is directed from its source to detection means along paths which are defined in part by said wave energy being reflected from the transparency and from the screen. Displacement of the screen, objective lens or transparency will cause displacement of a beam of the wave energy with respect to the detection means thereby to activate the latter. Motive means operated by the detection means moves the objective lens axially thereby to establish focus of the transparency and to reposition the beam of wave energy on the detection means.

30 Claims, 18 Drawing Figures

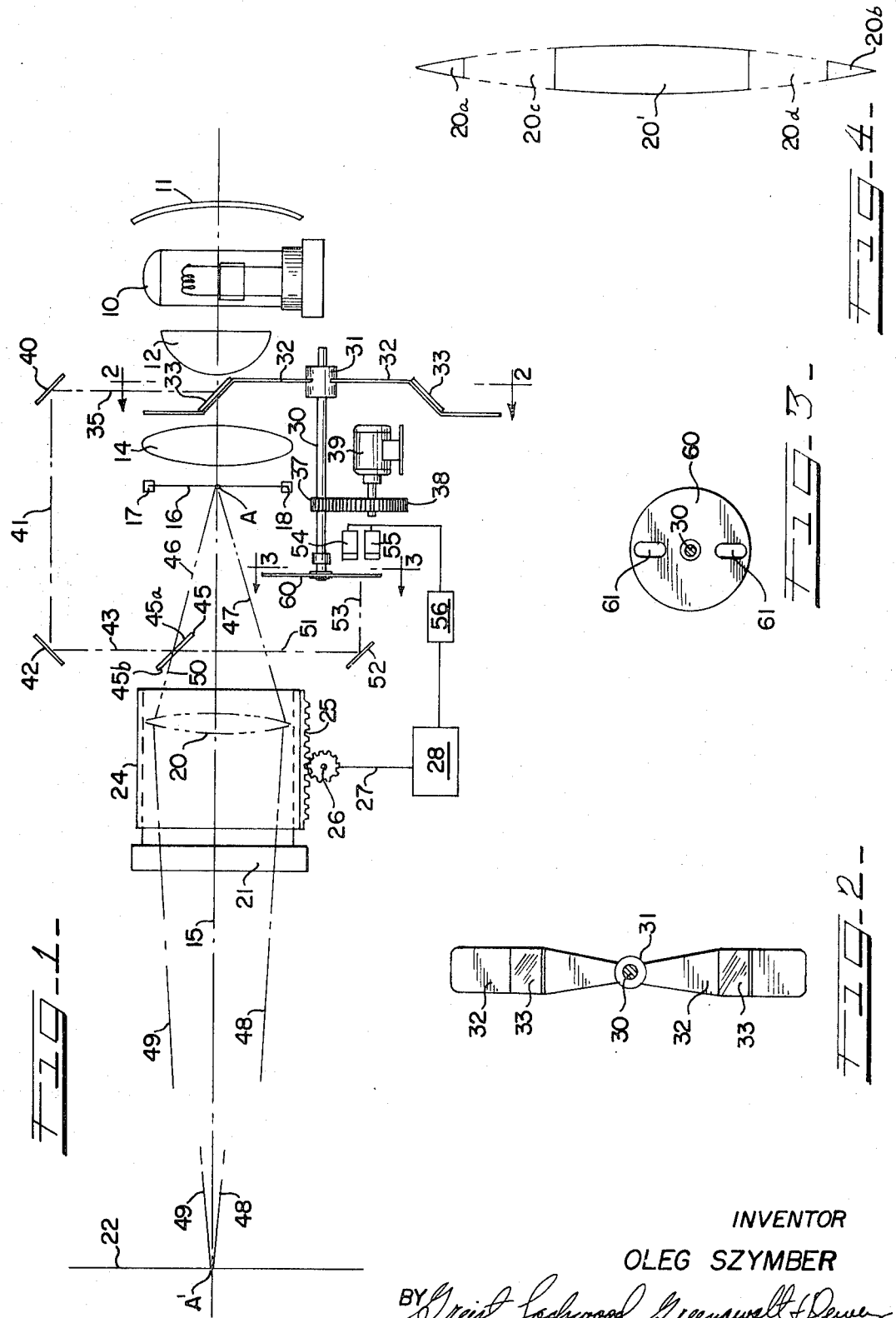

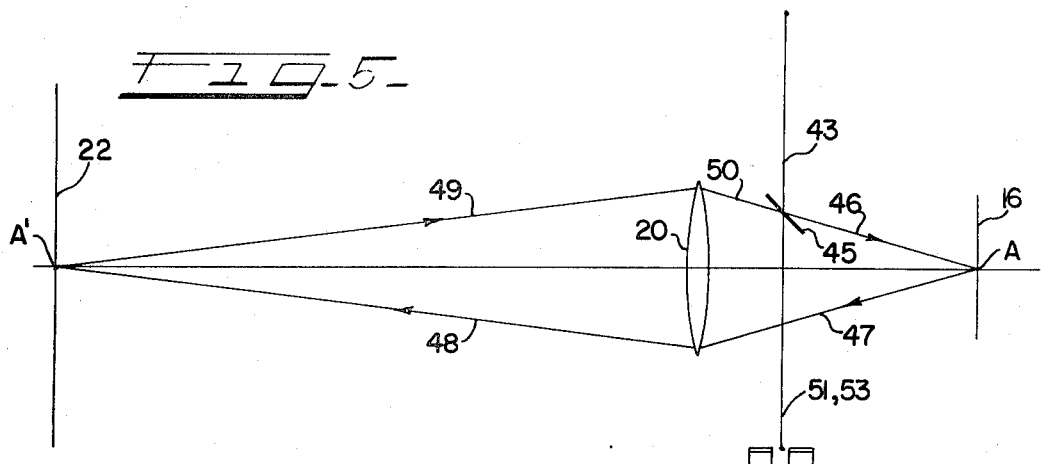
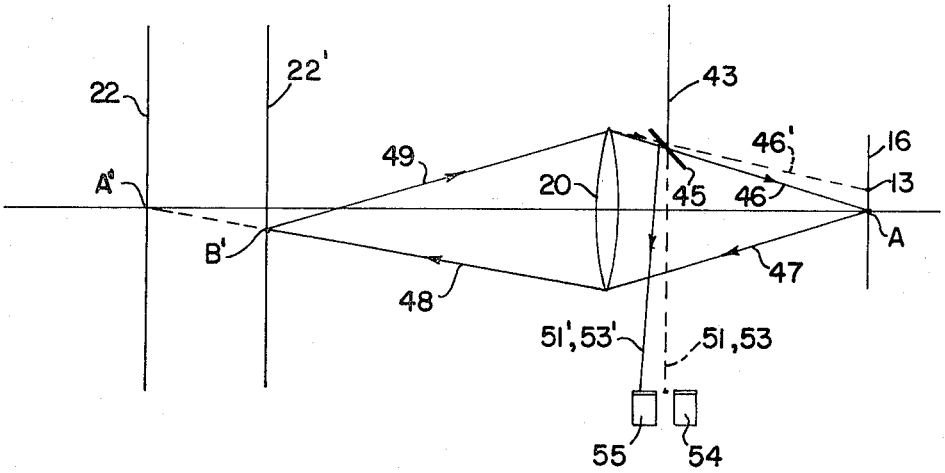
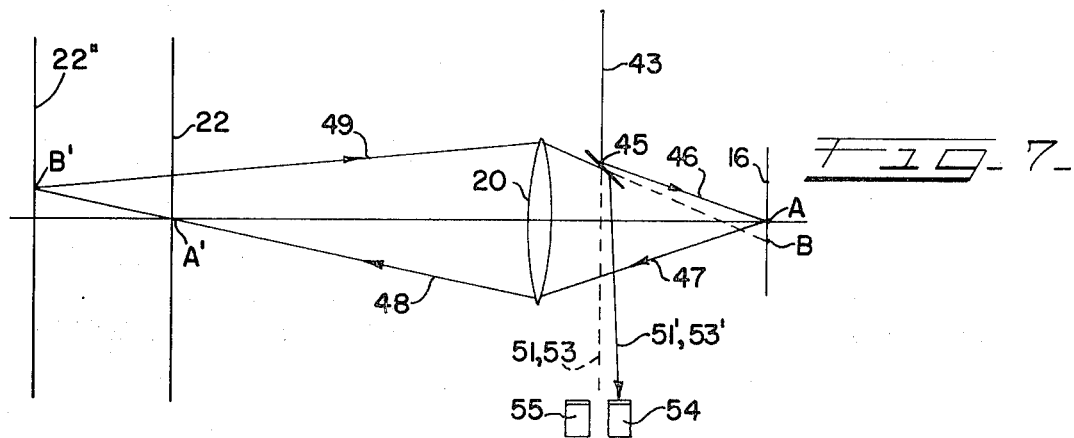

PATENTED JAN 18 1972

INVENTOR
OLEG SZYMBER
BY *Ernst, Lockwood, Greenawalt & Dewey*
ATT'YS.

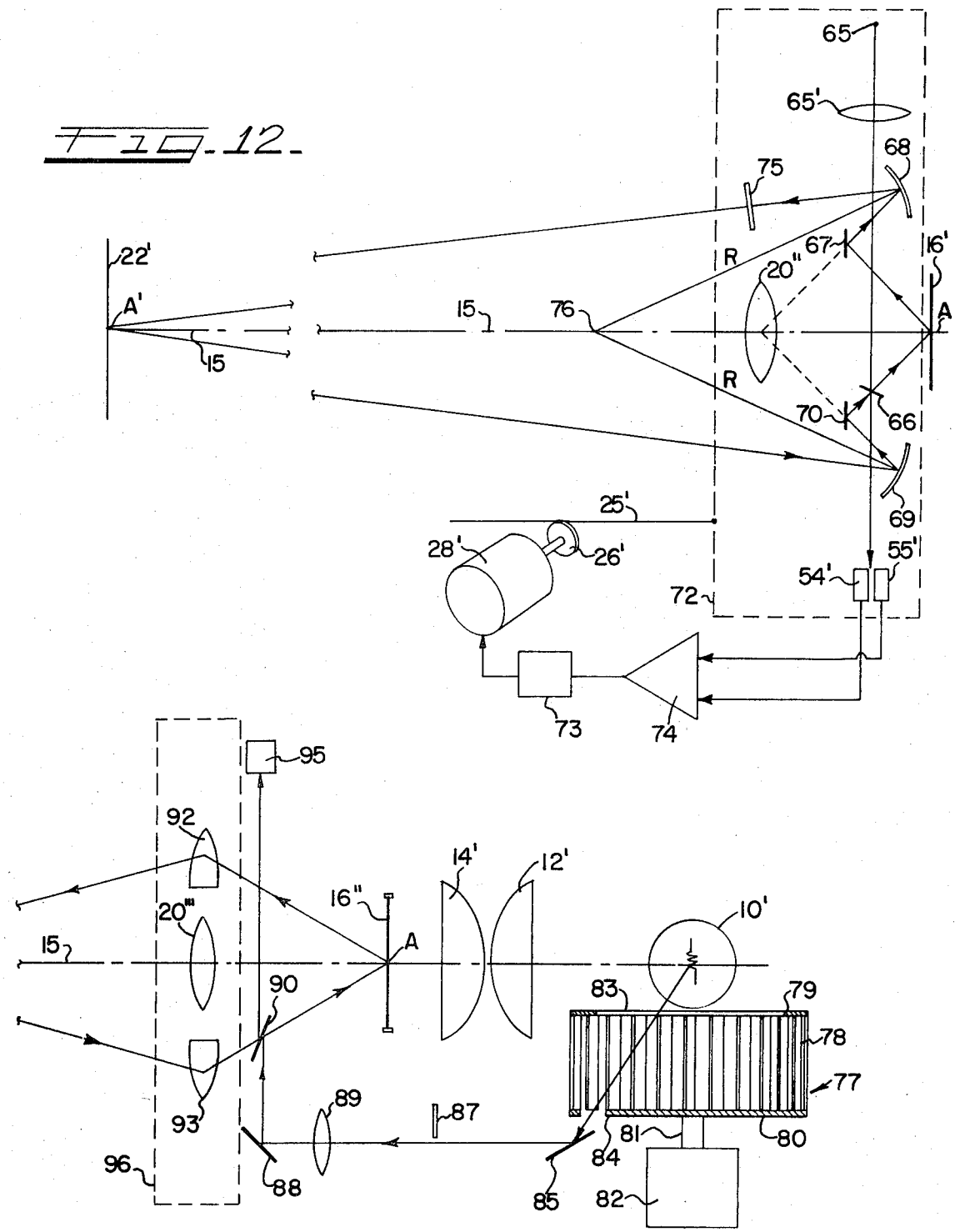

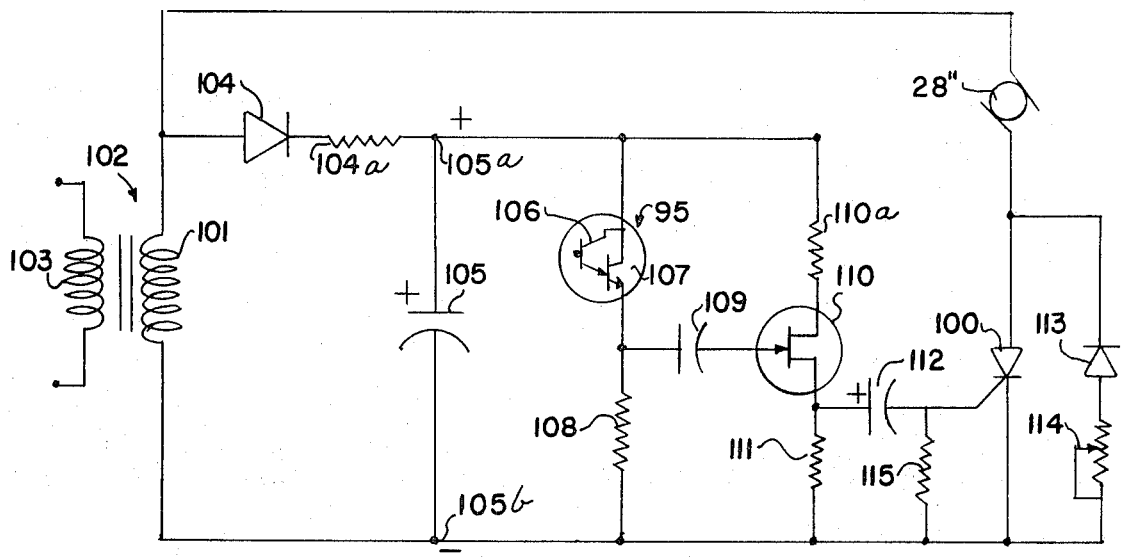
_Fig. 14_
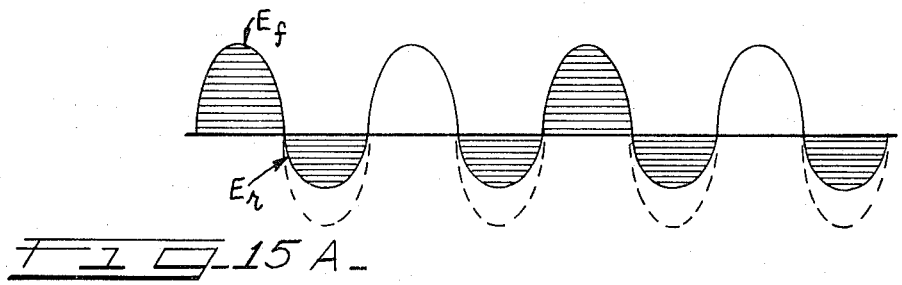
_Fig. 15A_
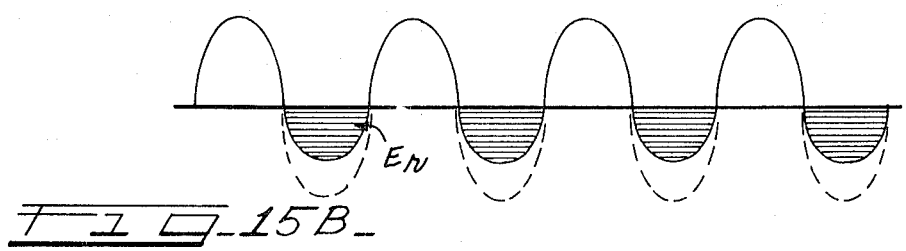
_Fig. 15B_
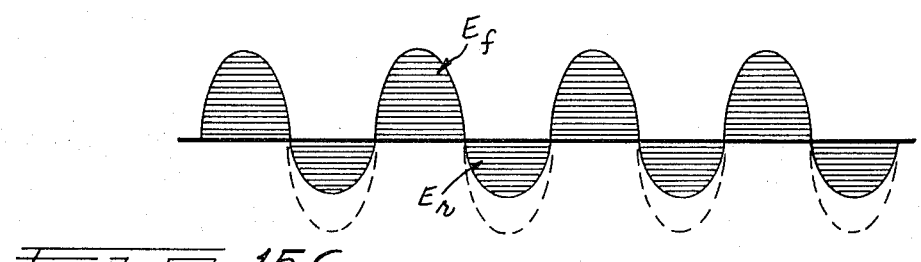
_Fig. 15C_

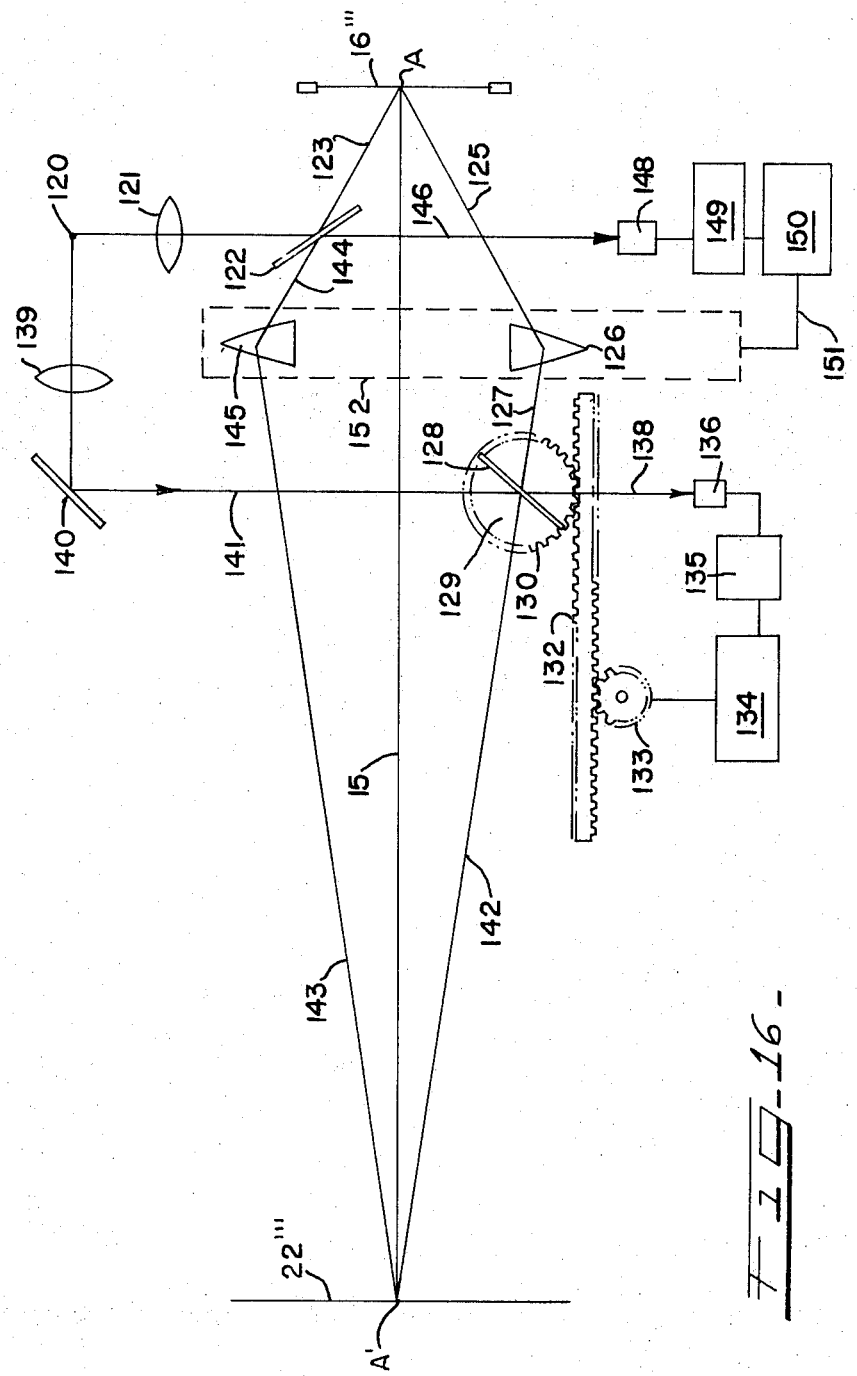

AUTOMATIC FOCUSING SYSTEM FOR PROJECTORS AND THE LIKE

This application is a continuation-in-part of my application filed July 22, 1969, Ser. No. 843,311, now abandoned.

BACKGROUND OF THE INVENTION

In recent years, slide projectors have been introduced into the market equipped with so-called automatic focusing systems. These systems are based on the automatic focus system shown in Shurcliff U.S. Pat. No. 3,037,423. According to the Shurcliff system, an appraisal subsystem including a beam of light is directed to the slide transparency and reflected to a pair of photocells. Displacement of the transparency, as the result of buckling, for example, will result in one photocell being illuminated to a degree greater than the other. This unbalanced condition actuates motive means for moving the objective lens to establish focusing. A lens element forming part of the appraisal subsystem also moves with the objective lens thereby to rebalance the appraisal subsystem for deactivating the latter when focus is established. Additional patents representing prior art systems are: Mitchell U.S. Pat. No. 2,947,215; Ewald et al. U.S. Pat. No. 3,205,766 and Stauffer U.S. Pat. No. 3,249,001.

These prior art systems are not actually fully automatic focusing systems as initial focus must be established by movement of the objective lens. The prior art systems are more properly characterized as systems for maintaining a preset distance between the slide transparency and the objective lens. The prior art systems compensate only for displacement of the slide transparency—they will not compensate for the transparency image being out of focus due to any displacement of the screen.

The present invention relates to a new and improved automatic focusing system which is truly automatic in that it will establish initial focus and will maintain focus notwithstanding displacement of the screen as well as the transparency.

OBJECTS OF THE INVENTION

A primary object of the present invention is the provision of a new and improved fully automatic focusing system for slide projectors, movie projectors, and the like.

A further object of the invention is the provision of a new and improved automatic focusing system wherein wave energy is directed from a source of such energy to detection means along paths which are defined in part by such wave energy being reflected from the film transparency and from the screen.

Still another object of the present invention is the provision of an automatic focusing system wherein peripheral portions of the objective lens, or other beam directing means, serve to direct wave energy from its source to detection means along paths which are defined in part by said wave energy being reflected from the transparency and the screen, and motive means operated by the detection means upon activation thereof for moving the objective lens thereby to establish focus and also to reposition a beam of the wave energy on the detection means for rebalancing the subsystem.

Another object of the present invention is the provision of a new and improved automatic focusing system of the type described wherein the means for directing the beam of such wave energy includes peripheral portions of the projector objective lens.

A further object of the present invention is the provision of an automatic focusing system of the type described wherein a movable member is provided which passes through the optical axis thereby intermittently to interrupt projection of a transparency image, wherein a movable shield is mounted over the detection means thereby intermittently interrupting the beam of wave energy which strikes the detection means, and wherein means are provided for moving said member and said shield in timed relation with each other such that the detection means is struck by a beam of such wave energy only when projection of a transparency image is interrupted.

Still another object of the present invention is the provision of an automatic focusing system according to the foregoing object wherein the member which interrupts the optical axis also serves as a means for providing the source of wave energy.

These and other objects and advantages of the invention will become apparent from the following specification disclosing a preferred embodiment of the invention shown in the accompanying drawings.

DESCRIPTION OF THE DRAWINGS

FIG. 1 is a side elevational view, largely diagrammatic, showing the various components of the automatic focusing system as embodied in a conventional slide projector;

FIG. 2 is a section taken along the line 2—2 of FIG. 1;

FIG. 3 is a section taken along the line 3—3 of FIG. 1;

FIG. 4 is a side elevational view of a modified objective lens arrangement;

FIG. 5 is a diagrammatic view showing the automatic focusing system in perfect focus;

FIG. 6 is a diagrammatic view of the system showing a certain out-of-focus condition occasioned by decreasing the distance between the projector and screen;

FIG. 7 is a diagrammatic view showing a second out-of-focus condition occasioned by increasing the distance between the projector and screen;

FIG. 12 is a sectional view, largely diagrammatic, showing another embodiment of the present invention;

FIG. 13 is a top plan view of still another embodiment of the invention;

FIG. 14 is an electrical schematic showing a circuit for activating the motive means which moves the objective lens;

FIGS. 15A, 15B and 15C are waveform diagrams of the circuit showing conditions of equilibrium, forward drive and reverse drive, respectively; and FIG. 16 is a diagrammatic view showing still another modification of the invention.

DESCRIPTION OF PREFERRED EMBODIMENTS

Figure 8:
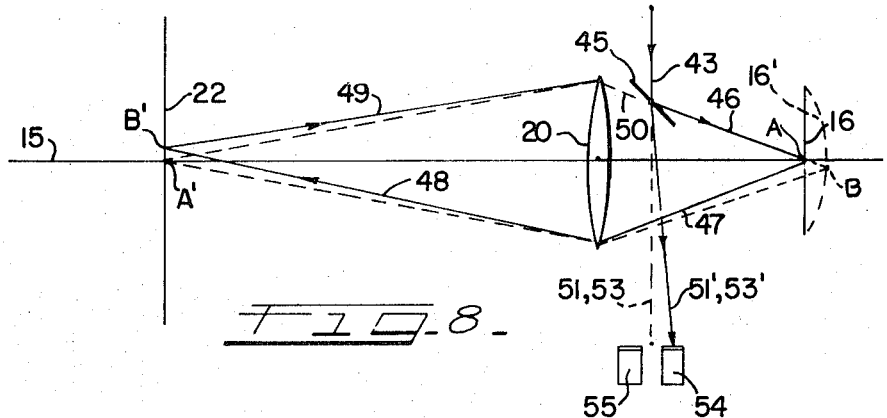
FIG. 8 is a diagrammatic view showing another out-of-focus condition occasioned by displacement of the slide transparency in one direction.

Referring to FIG. 1, the conventional components of a slide projector of any suitable type are seen to include a projection bulb 10 mounted in front of a reflector 11 and associated with a pair of lenses 12, 14 for projecting light along an optical axis 15. A film transparency, such as a 35mm. slide, is indicated at 16, members 17 and 18 representing a projection gate for holding the transparency in projection position. It will be understood the transparencies may be manually positioned in the gate or, as is usually the case, successively presented to the gate by a suitable automatic slide changing mechanism such as the type shown in Brown U.S. Pat. No. 3,120,150, for example.

The usual objective lens 20 is mounted in a barrel or sleeve 21, the latter being mounted for reciprocal movement parallel with the optical axis for focusing the transparency image on a remote screen 22. The lens barrel 21 may be mounted for sliding movement within a sleeve 24 and manually operated means (not shown) may be provided to move the barrel 21 relative to the sleeve 24 to achieve manual focusing, if desired. The sleeve 24, which is mounted for axial reciprocal movement by any suitable means (not shown), carries an axially extending gear rack 25 in meshing engagement with a pinion gear 26, the latter being driven by a shaft 27 in turn driven from a reversible electric motor 28. It will be understood that movement of the sleeve 24 imparts corresponding movement to the lens barrel 21, but the latter may be moved relative to the former to achieve manual focusing as mentioned above. It should be apparent that upon energization of the motor 28, the lens 20 will be moved along the optical axis in one direction or the other, depending on the direction of rotation of the motor 28, to achieve focusing.

The present invention includes an appraisal subsystem consisting primarily of wave energy directed from its source to detection means along paths which are defined in part by the wave energy being reflected from the transparency 16 and the screen 22. According to the embodiment of FIGS. 1–3 shown for purposes of illustration, the source of wave energy is provided by gathering unfiltered radiation from the main projection bulb 10. As is known to those skilled in the art, the condensing lens 14 includes a heat filter for cooling the light thereby to prevent damage to the film transparency. This cooling is achieved by removing infrared energy.

A shaft 30 is suitable journaled for rotation. This shaft mounts a hub 31, the latter supporting a pair of diametrically oppositely disposed blades 32 which are adapted to pass between the lenses 12, 14. The blades 32 are bent intermediate the ends thereof as shown and each carries a mirror or other reflective surface 33. It will be apparent that upon rotation of the blades 32, the mirrors 33 will reflect unfiltered radiation from the projection bulb 10 and direct a beam of such radiation along a path indicated at 35. The radiation beam 35 is of course intermittently formed as light is directed along this path only when one of the mirrors 33 intercepts the optical axis. The speed of rotation of the blades 32 is such that interception of the optical axis by these members does not interfere with projection; that is to say, interception of the optical axis by these members will not be perceptible to the eye of the observer. It will be apparent that during an instant when one of the blades 32 intercepts the optical axis, light from the projection bulb 10 will not be projected on the screen 22. The automatic focusing system according to the present invention may make advantageous use of this momentary interruption of projection on the screen 22 as will be explained hereinbelow.

The shaft 30 carries a gear 37 in meshing engagement with a larger gear 38, the latter being driven from a suitable electric motor 39. Preferably, the motor 39 will be included in the circuit with the projection bulb 10 so as to be energized along with the latter.

The beam 35 of wave energy of unfiltered radiation from the projection bulb 10 is intercepted by a mirror or other reflective surface 40 and directed along a path 41. The beam of wave energy along the path 41 is intercepted by another mirror or reflective surface 42 and directed along a path 43. A mirror 45 has a reflective surface on each side thereof. The reflective surface 45a directs the radiation rays along a path 46 where they strike the transparency 16. These rays will be reflected along a path 47 and will be intercepted by a peripheral portion of the objective lens 20. The peripheral portion of the lens will direct such rays along the path 48 where they will strike the screen at point A'. These rays of the wave energy or unfiltered radiation will be scattered, and some of the rays will be reflected along a path or beam 49 and intercepted by a peripheral portion of the lens 20. This peripheral portion of the lens 20 will direct such beam or rays along a path 50 which is colinear with the path or beam 46. The beam 50 strikes the other side 45b of the mirror 45 and is reflected along the beam or path 51 where it is intercepted by a mirror 52, then directed along a path 53 toward a pair of photocells 54, 55. It is to be understood that the various reflective members 40, 42, 45 and 52 are fixedly mounted in the projection housing in any suitable manner.

Detection means 56 including the pair of photocells 54, 55 are connected with the electric motor 28 so as to energize the latter for rotation in one direction or the other when the photocells do not receive equal amounts of radiation. Such detection means is deactivated when the photocells are equally illuminated or receive no radiation. Suitable detection means of this type are shown in aforementioned patents to Shurcliff, Mitchell, Ewald et al. and Stauffer.

Referring now to FIG. 5, which is a simplified diagrammatic illustration of the automatic focus system shown in FIG. 1, it will be understood that under sharp or perfect focus conditions, all of the light rays or waves of energy emitted from point A and allowed to pass through the lens 20 will converge at point A'. Conversely, all of the rays emitted from point A' and allowed to pass through the lens 20 will converge at point A. The lens 20 is movable along the optical axis and therefore is capable of focusing point A at point A' and vice versa.

Perfect focus is achieved when the following formula is satisfied:

$$\frac{1}{OS}+\frac{1}{OT}=\frac{1}{F},$$

wherein $OS$ and $OT$ are respectively the distances of the screen 22 and the transparency 16 from the lens 20 and wherein $F$ is the focal length of such lens. According to the present invention, wave energy is directed from its source to the photocells 54, 55 along paths which are defined in part by the beams of wave energy being reflected from the transparency 16 and the screen 22; the means for defining these paths includes peripheral portions of the objective lens 20. For any given position of the transparency 16 and the screen 22, the lens 20 will be moved so as to satisfy the above formula and achieve focus.

Referring to FIG. 6, assume that during previous use of the slide projector the objective lens 20 was positioned for achieving focusing with the screen 22 located relative to the projector as indicated. Assume that during the next use of the slide projector there is a different screen-to-projector distance represented by the screen being in the position as designated 22'. Now, the rays of the wave energy in the appraisal subsystem will not converge at point A' but rather at point B' thereby resulting in an out-of-focus condition. The rays of light from B' would converge at point B rather than point A if not for the mirror 45. This mirror will reflect the light along the path 51', 53' thereby causing the photocell 55 to receive more wave energy than the photocell 54. This will activate the detection means 56 for energizing the motor 28 in the appropriate direction to move the lens 20 (toward the screen) and achieve focusing satisfying the formula set forth above. It is important to note that the movement of the lens 20 will also shift the position of the reflective beams 51', 53' returning the same to a position wherein the photocells 54, 55 receive equal amounts of radiation thereby deactivating the detection means and deenergizing the motor 28. According to the present invention, the appraisal subsystem is rebalanced automatically as the lens 20 is moved to achieve focusing.

FIG. 7 diagrammatically illustrates the condition opposite that described in FIG. 6. In this condition, the lens 20 has been positioned for achieving focus with the screen 22 positioned relative to the projector as illustrated. A new screen-to-projector distance is represented by the screen being located as indicated at 22''. The rays of wave energy will now converge at B' rather than A' and would be focused at point B rather than A if not for the mirror 45. This condition will result in the photocell 54 receiving more radiation than the photocell 55 thereby activating the detection means for energizing the motor 28 in the other direction thereby moving the lens 20 in the other direction to refocus the projected image and to rebalance the appraisal subsystem.

FIG. 8 illustrates the condition wherein the screen-to-projector distance remains constant, but the position of the transparency 16 shifts due to buckling or popping of the slide. As is known to those skilled in the art, buckling or popping of the film transparencies is due to heating the transparencies as they are inserted in the projection gate. This buckling or popping will of course cause an out-of-focus condition. Assume that the transparency 16 has buckled or popped to the position 16'. This will cause the rays reflected from the mirror 45 to converge at point B rather than point A, this resulting in the rays converging on the screen 22 at point B' rather than point A' and causing an out-of-focus condition. Rays reflected from the point B' striking the other side of the mirror 45 will result in the photocell 54 receiving more radiation than the photocell 55 thereby to activate the detection means and energize the motor 28 for shifting the lens 20 (toward the transparency) so as to reestablish focusing. Again, this movement of the lens 20 will reposition the reflected wave energy along the path 51, 53 so as to provide the photocells 54, 55 with equal amounts of radiation thereby deactivating the detection system. It will be apparent that if the transparency 16 buckles or is displaced in the other direction, the photocell 55 will receive more radiation than the photocell 54 thereby to move the lens 20 in the opposite direction for establishing focus and again rebalancing the appraisal subsystem.

Returning now to FIGS. 1–3, the shaft 30 carries a disk 60 having a pair of diametrically oppositely disposed slots or apertures 61. It will be understood that whenever one of the mirrors 33 is disposed on the optical axis, a corresponding one of the apertures 61 will be disposed over the photocells 54, 55 so as to permit the reflected wave of beam energy 53 to strike the photocells. During the instant when one of the mirrors 33 intercepts the optical axis so as to provide a source of wave energy for bringing the appraisal subsystem into operation, projection of the image on the screen 22, at least in the area of the point A', will be prevented because of the obstruction formed by the presence of the mirror 33 in the optical axis. At this instant, one of the slots 61 will expose the photocells 54, 55 so as to receive the appraisal subsystem wave energy reflected from the screen at the point A'. This feature prevents "flooding" of the photocells from light rays reflected from the screen 22, or in other words, makes the photocells 54, 55 sensitive only to the radiation in the automatic focusing appraisal subsystem.

Other means for preventing flooding of the photocells or confusion between wave energy in the appraisal subsystem and the main projection system may be provided. It is observed that the wave energy used for projection of the transparency image is low in infrared content due to the presence of the filter associated with the condensing lens 14. However, the light being used in the automatic focusing appraisal subsystem is high in infrared content since the mirrors 33 intercept light from the projection bulb 20 before the light rays reach the filter associated with the lens 14. The photocells 54, 55 may be of the type which are sensitive primarily to wave energy high in infrared content, or the photocells may be made to react in this manner by the use of appropriate filters. Other techniques for avoiding confusion and flooding may be brought about by the use of ultraviolet light, for example, and by means of coding as discussed in the aforementioned patent to Shurcliff.

At this time it should be mentioned that the source of wave energy for the appraisal subsystem need not be defined by the arrangement shown in FIG. 1. A separate source of radiation, such as a small bulb located at the position of the mirror 42 for example, might be provided as a substitute. Another alternative would reside in the use of an arrangement of fixed mirrors located away from the optical axis and arranged to gather radiation from the projection bulb 10.

In the embodiment of the invention shown for purposes of illustration, focusing and rebalancing of the appraisal subsystem are achieved by movement of the objective lens 20. As is known to those skilled in the art, virtually all slide and movie projectors are equipped with movably mounted objective lenses to achieve manual and "semiautomatic" focusing as explained in Background of the Invention, supra. Therefore, the present invention makes advantageous use of the movably mounted objective lens. However, the present invention would encompass an arrangement wherein the objective lens is stationary and wherein either the transparency 16 or screen 22 is moved to achieve focusing and to rebalance the appraisal subsystem. As it is well known to those skilled in the art of slide projectors, it is impractical to move the transparency 16 to achieve focusing as such movement would be incompatible with automatic slide changers. In movie projectors, the film projection gate could be moved to achieve focusing without materially affecting transport of the film through such gate from the supply reel to the takeup reel. Movement of the screen (or projector) to achieve focusing and to rebalance the appraisal subsystem would be impractical for obvious reasons.

According to the embodiment of the present invention just described, peripheral portions of the objective lens 20 are employed to define the continuous path of wave energy. However, it is to be understood the present invention is not to be limited to the use of peripheral portions of the main objective lens to define this continuous path of wave energy in the appraisal subsystem.

For example, FIG. 4 shows an alternative lens arrangement including an objective lens 20' associated with two sublenses 20a, 20b. The lenses 20', 20a, 20b may be of the same focal length and considered as being formed from a single lens with the portions 20c, 20d removed. In such an arrangement, the sublenses 20a, 20b would have to be mounted for movement in unison with the objective lens 20' so as to rebalance the appraisal subsystem upon movement of the lens 20' in establishing focus. It should also be understood that in some arrangements the sublenses 20a and 20b might not be formed as indicated but might be of a different focal length than the objective lens 20'. In such an arrangement, the sublenses would have to move relative to the objective lens at a ratio represented by the respective focal lengths of the objective lens and such sublenses so as to achieve rebalancing of the automatic focus appraisal subsystem.

Figure 9:
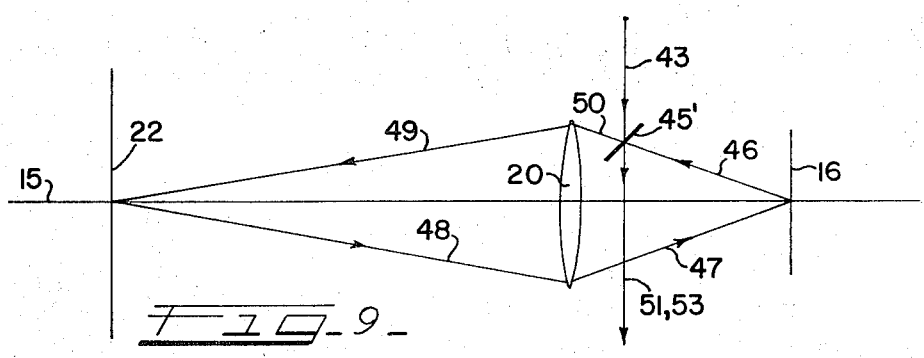
FIG. 9 is a diagrammatic view showing a modified arrangement wherein a mirror in the focusing subsystem is disposed at a different inclination from the disposition thereof shown in FIGS. 1–8.

FIG. 9 shows a modification wherein the mirror 45' is disposed at an inclination opposite to that shown in the arrangement of FIGS. 1–8. It will be understood that with the mirror 45' disposed as shown in FIG. 9, the operation of the automatic focus system will be the same as explained above.

Figure 10:
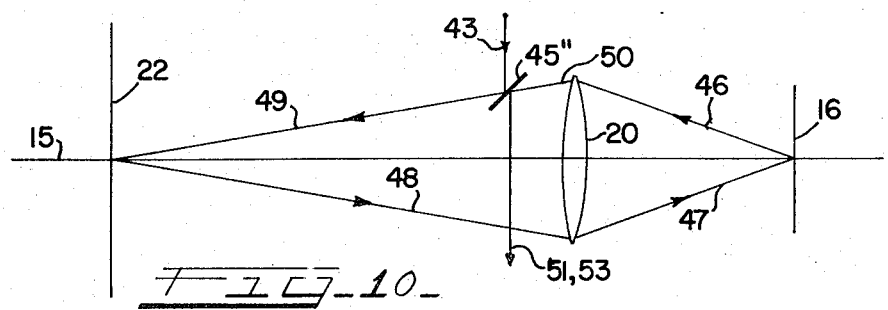
FIG. 10 is a diagrammatic view showing a modification wherein such mirror is disposed between the objective lens and the screen.
Figure 11:
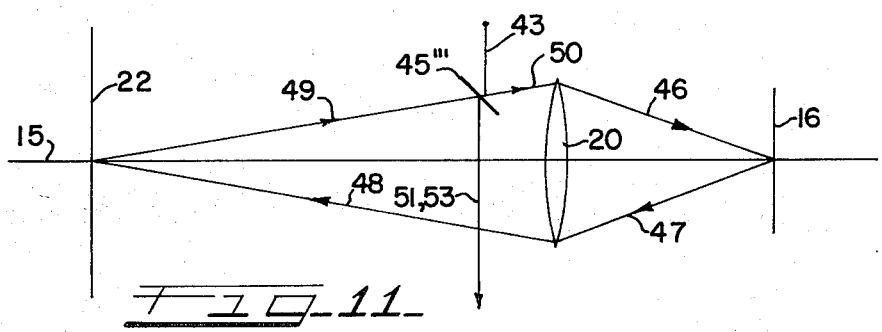
FIG. 11 is a diagrammatic view similar to FIG. 10 but showing a different angular disposition of the mirror.

FIG. 10 illustrates another modification wherein the mirror 45'' is disposed between the objective lens 20 and the screen 22. Again, the operation of the automatic focusing system would be the same as explained above. FIG. 11 shows a modification similar to FIG. 10 but with the mirror 45''' inclined opposite to that shown in FIG. 10. It is apparent that this difference in inclination of the mirror will not change the operation of the system.

Referring to FIG. 12, the embodiment shown therein differs from the aforedescribed embodiment mainly in that in the former the continuous path of wave energy is defined by a system of folding mirrors and spherical mirrors.

Wave energy or radiation from a separate light source, such as a small bulb 65, is focused by a lens 65' at a spot on one side of a mirror 66. This wave energy is reflected to the slide 16' at a point A on the optical axis 15 (when the system is in focus). Some of this wave energy reflected from the transparency is reflected by a mirror 67 to a spherical mirror 68, the latter serving to reflect this radiation at point A' on the screen 22'. Some of this wave energy reflected from the screen is reflected by another spherical mirror 69 onto a mirror 70. This mirror reflects the wave energy to the other side of the mirror 66 where the wave energy is then reflected for equally illuminating the photocells 54', 55' when the system is in focus.

The light source 65, the lens 65', the various mirrors, may all be mounted for movement in unison with the objective lens 20'' by an appropriate framework 72. The spherical mirrors 68, 69 are mounted such that their focal point 76 is coincident with the focal point of the lens 20''. A rack 25' is connected with this framework and is in meshing engagement with a gear 26', the latter being driven in either direction by the reversible electric motor 28'. This motor is activated by a suitable detection circuit 73, which circuit includes a differential amplifier 74 receiving input information from the photoelectric devices 54', 55'.

According to this embodiment, it may be desirable to provide an infrared filter 75 to prevent the formation of a visible light spot on the screen 22', which spot might be noticed by the observer depending on the characteristics of the particular transparency being projected. Such filter may be a Wratten type 87 filter. In association with such filter, it may also be desirable to employ silicon photodiodes for the detectors 54', 55', such diodes having a peak response in the area of 0.9 microns.

Although the primary purpose of the infrared filter 72 is to prevent the formation of a visible light spot on the screen 22', the use of such filter in conjunction with the aforedescribed silicon photodiodes will avoid any confusion between light from the main projection bulb and light emanating from the bulb 65 in the appraisal subsystem. This result is achieved since the beam striking the photodiodes is rich in infrared energy and since these diodes are sensitive primarily to such wave energy. Confusion between the light sources can also be eliminated by chopping the light from the source 65 and by including a high-pass filter in the detection circuit 73 thereby to make the latter more sensitive to the chopped light.

It should be apparent that if an out-of-focus condition is created by popping or displacement of the transparency 16' or by movement of the screen 22' in either direction, the continuous beam of wave energy will be displaced thereby directing the reflected wave energy unequally on the detectors 54', 55' so as to energize the motor 28' thereby moving the framework 72 in the appropriate direction to establish a focused condition and to reposition the reflected beam equally with respect to the detectors 54', 55'.

According to the embodiment of FIG. 12, all of the elements defining the appraisal subsystem move in unison with the objective lens. However, this is not a requirement as only the lens 20" and the mirrors 67-70 could be moved to achieve focusing and to rebalance the appraisal subsystem.

A further embodiment of the invention is shown in FIG. 13. The usual cooling fan which is standard equipment in slide projectors is generally designated 77. Such fan includes an impeller 78 rotatably mounted between two plates 79, 80 by a shaft driven by an electric motor 82. The plates 79, 80 have respective apertures 83, 84 formed therein, which apertures, in conjunction with the impeller 78 acts as a chopper to direct chopped light from the projection bulb 10' to a mirror 85. Such chopped light is directed past a plate 87 having a straight edge or knife edge. The chopped wave energy passing beyond the straight edge is focused on a mirror 88 by means of a lens 89. This wave energy is reflected to one side of a mirror 90 and then to the transparency 16" at a point A on the optical axis when the system is in focus. Some of the wave energy reflected from the transparency is focused onto the screen (not shown) by a lens element 92. Some of the wave energy reflected from such screen is then focused onto the other side of the mirror 90 by another lens element 93.

The lens elements 92, 93, in association with the objective lens 20''', are identical to the elements described above in the modified lens system of FIG. 4. The reflected wave energy is reflected by the mirror 90 to a phototransistor module 95, such as a General Electric L-14 planar silicon photo Darlington amplifier. By reason of the knife-edge plate 87, the pattern of wave energy striking the module 95 will have a sharp edge for proper operation of such module.

According to the embodiment, the objective lens 20' and the lens elements 92, 93 are movably mounted on suitable framework 96, the latter being mounted for movement in either direction by a small servomotor as explained above in connection with the other embodiments of this invention.

It will be apparent that displacement of the screen in either direction as well as buckling or displacement of the transparency 16" will result in displacement of the beam of chopped wave energy on the phototransistor 95.

The circuit for energizing the motor to move the framework 96 in response to displacement of the reflected wave energy on the phototransistor 95 is shown in FIG. 14.

The focusing motor 28" is connected by suitable transmission means to the framework 96; this motor is electrically connected in series with a silicon-controlled rectifier 100 across the secondary winding 101 of a transformer 102, the primary winding 103 of which may be constituted by the winding of the fan motor 82. Control of the SCR is effected by a control circuit deriving a DC operating potential from a rectifier 104 connected to one side of the secondary winding 101 and to a current limiting resistor 104a, which operating potential is filtered by the shunt capacitor 105 and applied across the light responsive semiconductor module 95 comprising a pair of NPN-transistors 106, 107 connected in the well-known Darlington amplifier configuration in order to provide a high gain. The module 95 is shielded by a housing having a transparent portion through which light may impinge upon the control element of transistor 106 which conducts in response to light. The emitter of the transistor 107 is connected through a resistor 108 back to the other side of the primary winding 101 and through a capacitor 109 to the control element of a field effect transistor 110. The source electrode of the FET 110 is connected through a load resistor 110a to the positive terminal 105a of the power supply defined by the rectifier 104 and capacitor 105. The drain electrode is connected through a drain resistor 111 to the negative terminal 105b of this power supply and through a capacitor 112 to the gate electrode of the SCR 100.

Connected in parallel with the SCR 100 but poled oppositely thereto is a rectifier 113, the anode of which is connected through an adjustable resistor 114 to the other side of the secondary winding 101. A resistor 115 holds the SCR gate at the cathode potential.

The operation of the circuit is as follows: If it is assumed that the projector is out of focus so that there is no or a minimum amount of pulsed light impinging upon the light sensitive area of the semiconductor 95, that module will be in a nonconducting state. Under this condition, the FET 110 will be in a steady state; therefore, the SCR 100 will be turned off. During this condition, the motor 28" will tend to rotate in one direction due to the conduction of the rectifier 113 on the half cycles of the applied alternating current and at a speed determined by the adjusted value of the resistor 114. When the motor is energized in this direction, it tends to move the framework 96 such that the beam of wave energy reflected from the mirror 90 is deflected toward the light receiving area of the module 95. As the motor 28" rotates in that one direction, the lenses 20", 92, 93 carried by the framework 96 will move in a direction so as to bring the system into focus and in so doing will cause the pulsed light impinging upon the semiconductor 95 to increase. This will cause pulsing of the module 95 which in turn will cause pulsing of the FET 110 through the capacitor 109. This signal will be amplified by the FET causing firing of the SCR 100 through the capacitor 112. With the conduction of the SCR on the half cycles of the applied alternating current opposite in polarity from those on which the rectifier 113 conducts, the motor 28" will be energized in the opposite direction until a condition of equilibrium is reached which will establish a focused condition.

Because the response time of the control circuit for the SCR is relatively fast due to the high gain of the semiconductor module 95, the motor 28" will tend to oscillate rapidly due to alternate half-cycle conduction of the SCR 100 and rectifier 113 and move the projection lens back and forth through the point where perfect focus of the projected image is achieved. This rapid back and forth movement of the projector lens, the amount of which movement is very small, may be termed a "hunting" kind of operation. By use of the exemplary circuit shown in FIG. 14, a very fast automatic focus is achieved which to the observer appears almost instantaneous. The system will seemingly be maintained in perfect focus in the eyes of the observer as the oscillations of the motor will be very slight and very rapid.

The operation of the circuit may be better understood by reference to FIGS. 15A, 15B and 15C showing the sine waveforms of electric power applied to the motor 28''. The shaded areas $E_f$ represent the electrical energy applied to the motor 28'' on the half cycles of conduction by the SCR 100 for driving the former in a "forward" direction. THe shaded areas $E_r$ represent the electrical energy applied to the motor on the half cycles of conduction by the rectifier 113 for driving the former in a "reverse" direction.

It will be appreciated that the rectifier 113 tends to drive the motor 28'' in one direction. In the embodiment of FIG. 13 shown for purposes of illustration, this direction of the motor moves the framework 96 in a direction such that the beam of wave energy reflected by the mirror 90 is displaced toward the light receiving area of the phototransistor 95, i.e., tending to flood the same with light; this direction may be termed the reverse direction. If this is the direction which will bring the system into a focused condition, the SCR 100 will not commence conducting until the system has reached a perfect focus condition and then tends to go out of focus in the other direction, whereupon the SCR 100 will commence conducting to establish the equilibrium condition of focus. In other words, in this condition the phototransistor 95 is in the dark and does not receive light until the rectifier 113 drives the motor 28'' slightly beyond the perfect focus condition whereupon the SCR 100 will commence conducting to establish the condition of equilibrium in which case the phototransistor will constantly be turned on and off as it " hunts."

In the other out-of-focus condition, the phototransistor 95 will be in the light whereupon the circuit including the SCR 100 will pulse rapidly in effect to overpower the rectifier 113 and drive the motor 28'' in the other direction, i.e., the forward direction, until the equilibrium or in-focus condition is reached.

FIG. 15A shows the circuit in the condition of equilibrium for establishing focus. In the embodiment shown for purposes of illustration, the variable resistor 114 is adjusted such that $E_f$ equals $2E_r$. This condition of equilibrium may be expressed as: $E_f \times F_f = E_r \times F_r$ wherein $F_f$ represents frequency of the forward half cycles and $F_r$ represents frequency of the reverse half cycles.

FIG. 15B shows the condition wherein the module 95 is not receiving light, whereupon the motor 28'' is being driven in the reverse direction. The condition wherein the module 95 is receiving a substantial amount of light is shown in FIG. 15C resulting in energizing of the motor 28'' in the forward direction.

According to the present invention, the wave energy of the appraisal subsystem is reflected from the film transparency in passing from the source of such wave energy to the detecting means. The percentage of wave energy reflected by the transparency is much less than the percentage of wave energy reflected by the mirrors and the screen. It will be appreciated that the particular photographic subject matter of the transparency at the portion thereof struck by the beam of wave energy of the appraisal subsystem is a factor in determining the reflective characteristics of the film. The loss of the appraisal wave energy at the transparency results in a reduction of signal strength which will be a factor in determining the maximum spacing between the screen and the projector. Under some conditions of use of the present invention, e.g., when the screen is spaced a substantial distance from the projector, the signal or beam of wave energy striking the detection means may not be strong enough to activate the latter. It will be appreciated that the distance between the projector and the screen will also be a factor, in addition to characteristics of the transparency, in determining the strength of the signal activating the detection means. FIG. 16 shows a modification which provides for strengthening such signal thereby permitting the screen to be moved a maximum distance from the projector.

Wave energy from a source of such energy, e.g., an incandescent bulb 120, is focused by a lens 121 and directed to one side of a mirror 122. This mirror is arranged such that the beam 123 of wave energy reflected therefrom will strike the transparency 16''' at the point A on the projector optical axis 15 when the system is in focus. Some of the wave energy reflected by the transparency defines a beam 125 which is focused by a lens element 126 and is directed toward the screen 22''' as a wave energy beam 127. The beam 127 would strike the screen at the point A' on the projector optical axis if not for the interpositioning of a tiltably mounted mirror 128 having reflective surfaces on opposite faces thereof.

This mirror may be tiltably mounted in any manner. In the embodiment shown for purposes of illustration, the mirror 128 is carried by a disc 129, the latter being rotatably mounted and being connected with an arcuate series of gear teeth 130. These teeth mesh with a first series of teeth on a rack 132, such rack having another series of teeth in meshing engagement with a pinion gear 133. This gear is driven by a reversible servomotor 134. This motor is actuated by a suitable detection circuit shown by the block 135, such circuit including a photoelectric member 136 which may be the same as the module 95 explained above. The beam 127 of wave energy striking one side of the mirror 128 is reflected as a beam 138 for striking the light sensitive element of the member 136.

Wave energy from the source 120 is focused by a lens 139 and directed to one side of a mirror 140. This wave energy is reflected by such mirror along a beam or path 141 and strikes the mirror 128 on the face or side thereof opposite the face which is struck by the beam 127. The wave energy in the appraisal subsystem is reflected by the mirror 128 along beam or path 142 for striking the screen 22''' at the point A' on the optical axis 15 when the system is in focus as illustrated in FIG. 16. Some of this wave energy is reflected along the path 143 and is focused along another path 144 by a lens element 145. The wave energy striking the mirror 122 is reflected along a path 146 for striking a photoelectric member 148, which member may be the same as the module 95 referred to above. The member 148 is a part of a detection circuit shown in block form as 149, which circuit actuates a reversible servomotor 150. The operating member of this motor is connected by appropriate linkage 151 to a frame 152, the latter being mounted by means (not shown) for reciprocal sliding movement along a path parallel with the projector optical axis 15. This frame carries the lens elements 126, 145 and also the projector objective lens (not shown). Of course, the lens elements 126, 145 may be defined by peripheral portions of the projector objective lens as described above.

The mirror 128 is mounted in such manner and the detection means including the member 136 are arranged such that the beams of wave energy 127 and 142 will be maintained in colinear relationship during operation of the automatic focusing system. It will be apparent that if the transparency 16''' buckles or pops in either direction, the beam of wave energy 127 will be deflected which will result in activation of the member 136. This in turn will result in actuation of the motor 134 for tilting the mirror 128 in the appropriate direction to maintain the beam 142 in colinear relation with the beam 127.

Thus, the automatic focusing system of FIG. 16 will operate in the same manner as the other embodiments of the invention described above. However, it will be noted that according to the modification of FIG. 16, the wave energy reflected from the film transparency serves only to activate the photoelectric member 136 and does not serve as the signal which is reflected from the screen to activate the photoelectric member 148. The wave energy which strikes the member 148 is not reflected from the transparency, but is reflected only from the screen 22''' and the several mirrors. The screen is the weakest reflective member in the path of wave energy from the source 120 the member 148; the reflective properties of the average photographic screen are such that the latter may be spaced from the projector a substantial distance without reducing the strength of the signal to a level below that required for activation of the member 148.

It will be apparent the present invention provides a fully automatic focusing system for a slide projector, movie projector or the like. The system will establish initial focusing of the transparency image so long as the screen is positioned relative to the projector within the range wherein focus can be achieved to the projector within the range wherein focus can be achieved by the limits of movement of the objective lens 20 or projector gate, as the case may be and wherein the wave energy reflected by the screen provides a signal of sufficient strength to activate the detection means. The system according to the present invention will maintain the transparency image in sharp focus on the screen notwithstanding buckling or popping of the transparencies in either direction and notwithstanding movement or displacement of the screen or projector. The present invention automatically provides for rebalancing of the appraisal subsystem regardless of whether the objective lens, transparency, projector or screen is moved to establish focus.

I claim:

1. In a projection device of the type including an element for positioning a transparency on an optical axis defined by an objective lens mounted between such element and a screen remote from the device, a system for automatically focusing a transparency image on said screen comprising:
   a. a source for emanating wave energy;
   b. detection means adapted to receive wave energy emanating from said source and responsive to the position of said wave energy thereon;
   c. means for directing a beam of the wave energy from said source to said detection means along paths which are defined in part by said wave energy being reflected from said transparency and said screen, such that displacement of either the screen or the transparency, as measured along the optical axis, will cause displacement of the wave energy upon said detection means; and
   d. motive means controlled by said detection means for changing the ratio of the distances of said screen and said transparency from said objective lens to establish focus of the transparency image and to reposition said wave energy on said detection means.

2. The automatic focusing means according to claim 1 wherein said wave energy directing means includes a mirror having reflective surfaces on opposite faces thereof.

3. The automatic focusing system according to claim 1 wherein said wave energy directing means includes said objective lens.

4. The automatic focusing system according to claim 1 wherein said wave energy directing means includes a pair of beam-directing elements associated with said objective lens.

5. The automatic focusing system according to claim 4 wherein said wave energy directing means further includes a plurality of reflective surfaces for directing said wave energy.

6. The automatic focusing system according to claim 4 wherein said beam directing elements are lenses having the same focal lengths as said objective lens.

7. The automatic focusing system according to claim 4 wherein said beam directing elements comprise a pair of concave mirrors having their focal points coincident with the focal point of said objective lens.

8. The automatic focusing system according to claim 7, wherein said concave mirrors are spherical mirrors.

9. The automatic focusing system according to claim 1 further defined by:
   a. said detection means including a right sensitive element and an AC circuit associated therewith;
   b. rectifying means in said circuit for energizing said motive means in a first direction;
   c. said circuit including switching means controlled by said light sensitive element for energizing said motive means in a second direction.

10. The automatic focusing system according to claim 1 further comprising:
    a. a reflective member having parallel, oppositely disposed first and second reflective surfaces;
    b. means tiltably mounting said reflective member between said transparency positioning element and said screen such that a first beam of wave energy reflected from a transparency strikes said first surface obliquely thereto;
    c. second detection means responsive to the displacement thereon of wave energy and positioned for receiving the beam of wave energy reflected by said first surface;
    d. means for directing a second beam of such wave energy from said source thereof to said second surface without being reflected from the transparency or the screen, such wave energy being reflected by said second surface for defining a second beam which strikes the screen; and
    e. second motive means controlled by said second detection means and operatively connected to said reflective member for tilting the latter to maintain said first and second beams in colinear relationship.

11. The automatic focusing system according to claim 1, further comprising means for chopping the wave energy emanating from said source; and circuit means operatively connected to said detection means and responsive only to such chopped wave energy.

12. The automatic focusing system according to claim 11, in which the means for chopping the wave energy comprises a movable member adapted to intermittently interrupt the wave energy emanating from said source.

13. The automatic focusing system according to claim 12, in which the source of wave energy comprises a projection bulb; and the movable member comprises a cooling fan for the bulb disposed in the path of wave energy between the bulb and the detection means.

14. In a projection device of the type having a gate element for positioning a transparency on an optical axis defined by an objective lens movably mounted between such element and a screen remote from the device, a system for automatically focusing a transparency image on said screen comprising:
    a. a source for emanating wave energy;
    b. detection means adapted to receive wave energy emanating from said source and responsive to the position of said wave energy thereon;
    c. means including beam directing means associated with said objective lens for movement therewith for directing the wave energy from said source to said detection means along paths which are defined in part by said wave energy being reflected from said transparency and from said screen, such that displacement of the screen, the objective lens or the transparency, as measured along the optical axis, will change the position of the wave energy on said detection means; and
    d. motive means controlled by said detection means and operatively connected to said objective lens for moving the same in either direction along the optical axis to establish focus and to reposition said wave energy on said detection means.

15. The automatic focusing system according to claim 14 wherein said beam-directing means is defined by marginal portions of said objective lens.

16. The automatic focusing system according to claim 14 wherein said wave energy directing means includes a mirror including reflective surfaces on opposite faces thereof.

17. The automatic focusing system according to claim 14 wherein said beam-directing means includes a pair of concave mirrors having their focal points coincident with the focal point of said objective lens.

18. The automatic focusing system according to claim 14 further defined by:
    a. a projection bulb on said optical axis;
    b. a movable member intermittently passing through said optical axis between said gate element and said projection bulb to intermittently interrupt projection of the transparency image;
    c. a movable shield disposed over said detection means to intermittently interrupt the wave energy striking said detection means; and d. means for moving said movable member and said shield in timed relation with each other, such that said detection means is struck by wave energy only when projection of a transparency image is interrupted.

19. The mechanism according to claim 18, wherein the movable member includes a reflective surface disposed to intermittently reflect wave energy emanating from said projection bulb, said reflective surface forming a part of said wave energy directing means.

20. The automatic focusing system according to claim 14 wherein said beam-directing means includes a pair of lens elements associated with said objective lens.

21. The automatic focusing system according to claim 20 wherein said wave energy directing means further includes a plurality of reflective surfaces for directing said wave energy.

22. The automatic focusing system according to claim 20 wherein said lens elements have the same focal length as said objective lens.

23. In a projection device of the type having a gate element for positioning a transparency on an optical axis defined by an objective lens mounted between such gate element and a screen remote from the device, a system for automatically focusing a transparency image on said screen element comprising:
a. a source for emanating wave energy;
b. detection means adapted to receive wave energy emanating from said source and responsive to the position of said wave energy thereon;
c. means including beam directing means associated with said objective lens for directing such wave energy from said source to said detection means along paths which are defined in part by said wave energy being reflected from said transparency and said screen, such that displacement of the screen, the objective lens or the transparency, as measured along the optical axis, will cause displacement of said wave energy on said detection means; and
d. motive means controlled by said detection means for moving at least one of said gate element and said objective lens to satisfy the formula:

$$\frac{1}{OS}+\frac{1}{OT}=\frac{1}{F},$$

wherein $OS$ and $OT$ are respectively the distances of said screen and said gate element from said objective lens and F is the focal length of said objective lens, and to reposition said wave energy on said detection means.

24. The automatic focusing system according to claim 23 wherein said beam-directing means includes marginal portions of said objective lens.

25. The automatic focusing system according to claim 23 wherein said beam-directing means includes a pair of concave mirrors having their focal point coincident with the focal point of said objective lens.

26. The automatic focusing system according to claim 23 further defined by:
a. a projection bulb on said optical axis;
b. a movable member intermittently passing through said optical axis between said gate element and said projection bulb to intermittently interrupt projection of the transparency image;
c. a movable shield disposed over said detection means to intermittently interrupt the wave energy striking said detection means; and
d. other means for moving said movable member and said shield in timed relation with each other, such that said detection means is struck by wave energy only when projection of a transparency image is interrupted.

27. The automatic focusing system according to claim 26, wherein the movable member includes a reflective surface disposed to intermittently reflect wave energy emanating from said projection bulb, said reflective surface forming a part of said beam directing means.

28. The automatic focusing system according to claim 23 wherein said beam-directing means includes a pair of lens elements associated with said objective lens.

29. The automatic focusing system according to claim 28, wherein said beam-directing means includes a plurality of reflective surfaces for directing said wave energy.

30. The automatic focusing system according to claim 28 wherein said lens elements have the same focal length as said objective lens.

* * * * *